United States Patent [19]

Ulbers et al.

[11] Patent Number: 4,744,661

[45] Date of Patent: May 17, 1988

[54] DEVICE FOR MEASURING SMALL DISTANCES

[75] Inventors: Gerd Ulbers, Weilersbach; Karl Hutter, Muhlhausen, both of Fed. Rep. of Germany

[73] Assignee: Hommelwerke GmbH, Fed. Rep. of Germany

[21] Appl. No.: 940,011

[22] Filed: Dec. 10, 1986

Related U.S. Application Data

[63] Continuation-in-part of Ser. No. 883,553, Jul. 9, 1986.

[30] Foreign Application Priority Data

Mar. 26, 1986 [DE] Fed. Rep. of Germany ....... 3610154
Sep. 11, 1986 [DE] Fed. Rep. of Germany ....... 3630887

[51] Int. Cl.$^4$ .............................................. G01B 9/02
[52] U.S. Cl. ................................. 356/358; 350/96.11
[58] Field of Search ............... 356/345, 358, 359, 360, 356/4.5; 350/96.11, 96.52

[56] References Cited

U.S. PATENT DOCUMENTS 3,472,597 10/1969 Whitten, Jr. ....................... 356/345
3,837,728 9/1974 Logan et al. ...................... 350/96.13
4,120,588 10/1978 Chaum ........................... 350/96.12 X
4,538,911 9/1985 Heynacher et al. ................. 356/358

Primary Examiner—Davis L. Willis
Assistant Examiner—Matthew W. Koren
Attorney, Agent, or Firm—Allegretti, Newitt, Witcoff & McAndrews, Ltd.

[57] ABSTRACT

A device for measuring small distances, provided with a sensing tip mounted to be movable in the direction of the length to be measured, a transducer for converting the movements of the sensing tip into corresponding electric signals, and indicating means to indicate such signals. The transducer comprises an optical interferometer provided with a measuring waveguide. One end of the waveguide is connected to a laser and the other end to optical means for directing the light onto a measuring mirror disposed at a distance. The light is reflected by the mirror back to the optical means. The measuring mirror is connected to the sensing tip. The interferometer further includes a reference waveguide linked to the measuring waveguide. The reference waveguide has a mirror disposed at one end and a photoelectric transduer at the other end. The transducer is connected to the indicating means for indicating the output signals of the transducer. The device permits a cost-effective and uncomplicated construction as an integrated unit. The device affords precision measurements at accuracies in the range of one half of the wavelength of the lasr beam, or even far below such a value. The device also exhibits a high linearity for substantially greater distances. The device is also suitable for measuring extremely rapid changes in length while using a small bearing pressure on the sensing tip.

10 Claims, 4 Drawing Sheets

DEVICE FOR MEASURING SMALL DISTANCES

This is a continuation-in-part of U.S. patent application Ser. No. 883,553 filed July 9, 1986.

BACKGROUND OF THE INVENTION

The present invention relates to a device for measuring small lengths or distances. Such devices may include a sensing tip which is movable along the length to be measured, a transducer for converting the movements of the sensing tip into a corresponding electric signals, and an indicator for indicating the electrical signals.

Devices of this kind, for measuring small lengths or sections, have been known for some time. For example, a device of this type, in the form of a mechanically inductive transducer, is shown in FIG. 9 of German patent specification No. 11 00 978. The sensing tip of this prior device moves an iron core in a system of coils. The coils are enclosed in a measuring bridge which supplies an electric output signal. The output signal is dependent on the movements of the sensing tip. The relatively heavy weight of the iron core being moved, however, substantially reduces the speed at which the device may measure distances. In addition, the weight of the iron core subjects the sensing tip to a great deal of wear, and this wear becomes even more acute the finer, or more delicate, the sensing tip is. Such delicate sensing tips, however are required to properly sense the fine structure of a surface. Another disadvantage of the foregoing device is its limited linearity, especially when it is executing large measuring strokes.

SUMMARY OF THE INVENTION

The object of the present invention is to provide a device of the type discussed above which is for measuring small distances or lengths. The movable parts of such a device should be relatively light weight. The sensing tip of the device may have a small rounding off radius. Thus, the device exhibits a high sensing speed in sensing the fine structure of a surface. This enables the device to exhibit a high degree of linearity and high resolution when the device is executing large measuring strokes.

The invention is based on the principle that the position and/or the movements, respectively, of the mechanical sense organ for sensing a given length, or distance, can be achieved practically weightlessly solely with the assistance of a reflecting surface disposed at the sense organ. In connection with optical phase measurement which is performed by means of an interferometer of the type described, in part, in the publication "Laser und Optoelektronik", Vol. 1, 1984, page 19, FIG. 3. This known interferometer was, however, modified so that the light from the measuring waveguide is deflected by optical means, passed onto the reflector connected to the sensing tip (or sensor), and returned the same way by the reflector to the measuring waveguide. Except for the means for holding and guiding the sensing tip, no other weight is placed on the sensing tip. Thus, the weight on the sensing tip is minimized, and only a small amount of bearing pressure is necessary to enable the sensing tip to accurately follow the particular configuration of a surface. Such accurate following is required, for example, to sense the fine contours of the surface of a workpiece and to sense and determine any changes in length that correspond to the surface contour. Any such length variations are subsequently converted by the interferometer into electric signals. The sensing speed may be selected to be very high. The interferometer provides high resolution over a large measuring range.

The optical means for shutting out or deflecting the light on the measuring waveguide consists preferably of a diffraction grating generally of the type described in the periodical "LASER MAGAZINE", No. 4, 1985, page 75. The disclosed device is used in connection with a scanner for sensing phonographic records with optical recording grooves. However, other optical means for focusing the light from the measuring waveguide onto the reflector are also suitable. Preferably, the light is in the form of parallel rays or parallel beams (bundle of rays). However, in some cases, a partial or complete focusing onto the measuring reflector (or mirror) may be appropriate and called for.

The interferometer can have any desired embodiment. Instead of limited photoconductors, photoconductive laminar layers can also be used.

The measuring mirror is located on a sensing tip or a part that moves with the sensing tip, so that the length is scanned mechanically. However, it is still within the framework of the invention to use one surface directly as a measuring reflector, where the distances to the surface are to be measured as length values, and the surface has adequate reflective properties.

The movable mounting means of the sensing tip may take the form of a two-arm lever, with the sensing tip being attached to the end of one arm and the measuring mirror to the other arm. It is also possible to use a one-arm lever, with the mirror being disposed in the region of the sensing tip. This has the advantage that the mass being moved by the deflections of the sensing tip is further reduced. The measuring mirror may also be disposed at one end of a parallel extending measuring rod, the other end of which having the sensing tip affixed thereto.

With both types of the movable mounting of the sensing tip, and particularly with the lever type mounting, it has been found most useful for the measuring mirror to take the form of a triple mirror or a glass sphere. Such an arrangement helps ensure that the light is always reflected in the same direction back to the optical means, even if changes in the angular position of the measuring mirror occur. In this way the optical means may shunt or deflect light out of the measuring waveguide as well as cause the light to return.

For length measurements in the range of one-half of the waveguide of the light emitted by the laser, an indicator in the form of a voltage or current meter may be used. The deflections of the meter correspond to the intensity of the light intercepted by the photoelectric transducer and the voltage or electric current supplied by the transducer. In addition, it may be useful to employ a counter as an indicating means when an extensive measuring range, having a multiple of the wavelength of the measuring light, is to be covered. The counter functions to count the variations in light intensity that correspond to the measured changes in length brought about by interference. Thus, the counter displays a count value which, considering the wavelength of the measuring light, is completely proportional to the length, or amount of change in length, encountered by the sensing tip. A measurement is performed, for example, by first placing the sensing tip upon the starting point of the length to be measured. The counter is simultaneously reset to zero. The sensing tip is then allowed to proceed to the end value of the measured length, and the counter is read off. The procedure is repeated when another distance, or length, is to be measured.

To prevent a resetting of the counter and to be able to measure accurately the distances along different directions of the deflections of the sensing tip, it is useful to determine the direction of movement of the sensing tip. Accordingly, it is useful for the counter to operate in dependence on the particular direction that the sensing tip moves, i.e. count either up or down. The counter may thus be in the form of an up and down counter. The direction of the movement of the sensing tip is determined by the measuring line which is effective, with the assistance of a coupling, to couple out a portion of the light from the reference waveguide. Such coupling has been described in the dissertation submitted by Dipl.-Ing. H. Schlaak, Berlin 1984, pages 28–29. The portion of light just described as having been "coupled out" is supplied, by means of a phase modulator, to another photoelectric transducer. Consequently, the phase position is shifted by 90° with respect to the phase position at the end of the reference waveguide. A phase modulator of the foregoing type has become known from the publication "Laser und Optoelektronik" No. 1, 1984, p. 27. FIG. 33. As the sensing tip executes its movements, the two photoelectric transducers emit two measuring potentials displaced by 90° with respect to each other. Together, the two measuring potentials form a rotary field having a direction of rotation which corresponds to the direction of movement of the sensing tip. The direction of counting by the up and down counter is thus controlled by the rotary direction. This mode of determining the direction of movement has been described separately for example, in the dissertation entitled "A Laser Interferometer for Photoelectric Motion Measurement in the Two Lateral Coordinates", submitted by Gerd Ulbers, 1981, University of Hannover, p. 58 ff, particularly p. 68, FIG. 29.

The above prior publication also describes a method of improving the accuracy of the measurement by subdividing the cycle of the rotary potential. See Section 10.4 of the publication. A further modification of the invention resides in such signal cycle subdivision being employed and in the inventive device for resolution enhancement.

In a particularly useful embodiment of the present invention the measuring waveguide, the reference waveguide, and the branch waveguide are formed, in a manner known per se, in or on the surface of a common plate (or board). Laser and/or photoelectric transducers are secured, in a straightforward manner, to the lateral edges of the plate where the waveguides also terminate. The mirror of the reference waveguide consists conveniently of a reflecting coating applied to the edge of the plate in the area where the reference waveguide termintes. The waveguides may be constructed in or on the plate by known means, either by the application of glass fibers onto the plate or by structuring the waveguides in the surface of the plate as it has been described, for example, in the publication "Laser und Optoelektronik", No. 1, 1984, p. 26, FIG. 31. Also, the phase adjusting means can be directly applied to the surface of the plate, as it has become known from the above cited periodical "Laser und Optoelektronik", 1983, p. 112, FIG. 3. Finally, in accordance with yet another embodiment of the present invention, the optical means focuses the light from the measuring waveguide onto the measuring mirror and intercepts the light again as it is reflected by the mirror. The optical means may be disposed directly upon the surface of the plate in the form of a diffraction grating, pursuant to the above cited reference "LASER MAGAZINE", 1985, p. 75. As a whole, all optical or optoelectrical component parts, as well as the photoelectric transducers and/or the laser of the inventive device, may be integrated in one plate, with the smallest possible dimensions. Consequently, the device may be manufactured in a straightforward, simple and inexpensive manner. To keep out any effects of temperature fluctuations, the entire plate, including its optoelectronic components, is seated on a Peltier element.

In one particularly suitable addition to the invention an optical electronic range finder is used. With a preset range value, the range finder emits an electrical signal, which sets the counter used for the indicator device to zero. This optical electronic range finder does not need to have great precision over a wide range of measurement. Rather, it need only have great precision at the present range value or length of measuring value, in order to be able to set the counter precisely to zero there.

A focus position measuring system is well suited for the purpose of an optical electronic range finder. The system has a high level of precision, if the reflecting surface measured at a distance is precisely in the focusing position. This is used in the invention for setting the device at zero. The interferometer measures extremely precisely in the nm-range over large distances, but only in a relative manner. The system consequently provides the interferometer with a reference value or zero value, so that, in addition to the valuable properties stated, there is also the possibility of being able to measure absolute lengths.

Lenses can be used as focusing devices, as can focusing optical screens. Thus, it is suitable to construct the entire optical system in a photoconductive layer of a plate, whereby laser and photodiodes are coupled to or coupled into the corresponding points. Such a type of optical electronic system is known from the periodical "LASER MAGAZINE", 4/85, page 75.

The focus position measuring system can be a system which is completely independent of the interferometer. Such a system uses a separate mirror on the sensing tip, or on its part which moves with the sensing tip. This embodiment has the advantage that, with a focused beam from the interferometer, the signal-to-noise ratio of the interferometer signal is large relative to parallel light.

It is, however, in accordance with another embodiment of the combination of the interferometer and focus position measuring system, also fundamentally possible to use the same laser for both systems. Such an arrangement is possible if, out of the light which has been reflected from the measuring reflector, one part is diverted and then reused in the manner which is typical for the focus position measuring system. The light may be diverted by means of a semi-transparent mirror.

If both the interferometer and the focus position measuring system are constructed in or on optically conductive plates, it is practical to construct these plates as a common piece. From this there results a stable and slight height of construction. This is also made possible by another further form of the invention. In such an embodiment, by means of the first focus screen, a deflecting mirror is positioned with an inclination of approximately 45° to the plate. The deflecting mirror deflects the essentially vertical beam issuing from the plate into the level of the plate. Consequently, the course of the beams outside the plate runs in the direction of the plate. This is particularly advantageous if the measuring reflector is located on the rear end of a measuring striker unit as the forward end of the unit has the sensing tip.

BRIEF DESCRIPTION OF THE DRAWING

A preferred embodiment of the present invention is described herein in further detail, with reference to the drawing, wherein.

DETAILED DESCRIPTION OF THE PREFERRED EMBODIMENT

Figure 1:
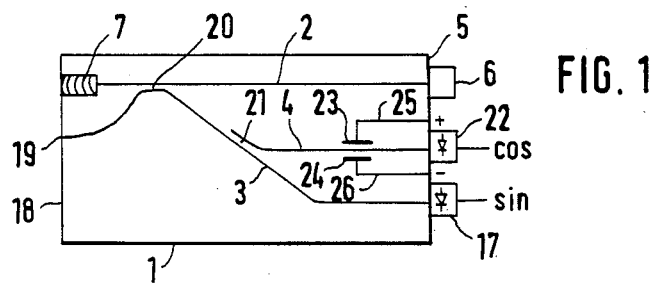
FIG. 1 is a top view of the essential optoelectronic portion of an embodiment of the present invention.

The optoelectronic device of FIG. 1 comprises a plate 1 (or board) made of lithium niobate crystal or silicon crystal. Structured in the surface of the plate 1, by a method known per se and explained in the foregoing portions of this specification, are a measuring waveguide 2, a reference waveguide 3, and a branch waveguide 4. The measuring waveguide 2 leads to an edge 5 of the plate 1, where a laser 6 is directly applied. The laser 6 is applied, by means of an adhesive, for example, so that its light beam is being passed into the measuring waveguide 2. At its other end, the measuring waveguide 2 terminates in a diffraction grating 7 by which the light is deflected substantially vertically with respect to the plate 1, as it is indicated by the arrow 8 in the side view of FIG. 2. The light impinges upon a triple mirror 9 by which it is reflected back to the diffraction grating 7, as indicated by the arrow 10. From the diffraction grating 7, the light is returned to the measuring waveguide 2. The beams of light extend substantially parallel, as it is indicated by the arrows 8 and 10.

The triple mirror 9 is attached to one end of an arm 11 of a two-arm lever 12. The other arm 13 of the lever 12 has attached to its extreme end a sensing tip 14 which is illustrated as being in contact with the surface 15 of a workpiece 16. The elevational profile of the surface 15 of the workpiece 16 is to be determined, for example, as a measure of the change in length in dependence of the profile direction.

The reference waveguide 3 shown in FIG. 1 extends up to the edge 5, where a photoelectric diode 17 is affixed so as to be capable of intercepting the light from the reference waveguide 3 and converting it into a corresponding electric current or voltage signal. The other end of the reference waveguide 3 extends up to the edge 18 of the plate. The edge is smoothly polished and is provided with a reflective coating. Thus, at least in the area where the reference waveguide 3 terminates, a reflector 19 is formed at that end of the reference waveguide 3.

For a short distance, the reference waveguide 3 approaches and runs alongside the measuring waveguide 2 so as to give rise to a coupling element 20. The branch waveguide 4 approaches with one end the reference waveguide 3 to form a coupling element 21. With its other end, the branch waveguide 4 terminates in the area of the photoelectric diode 22 by which the light from the branch waveguide 4 is intercepted and subsequently converted into a corresponding electric voltage signal. Over a short distance, electrodes 23 and 24 are disposed on either side of the branch waveguide 4. The electrodes 23 and 24 are connected by lines 25 and 26 to a variable direct voltage source. This is schematically indicated by plus and minus symbols. By adjusting the direct voltage at the electrodes 25 and 26, the phase position of the light at the photoelectric diode 22 is set with respect to the light at the photoelectric diode 17. Accordingly, the phase of the electric current at the outlet of the photoelectric diode 22 is displaced by 90° with respect to the phase of the electric current at the photoelectric diode 17.

Figure 2:
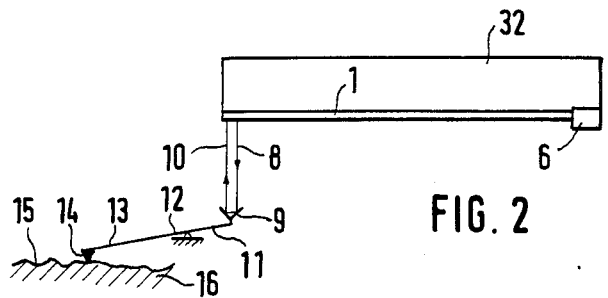
FIG. 2 is a side view of the embodiment of FIG. 1, including the mechanical sensing member of the device.
Figure 3:
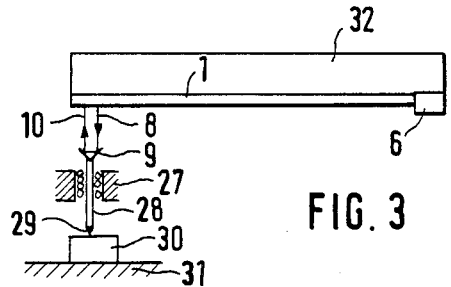
FIG. 3 is a side view of the present invention, showing a modification of the invention shown in FIG. 2.

To enhance stability, the plate 1 of FIGS. 2 and 3 is fixedly secured on a Peltier element 32 whose function it is to stabilize the temperature of the interferometer and to maintain it at a constant value.

To eliminate noise and drifting, the laser or the laser beam may be modulated by a carrier frequency which is subsequently modified by conventional techniques to be used in carrier frequency signal processing.

If, during operation of the device of FIGS. 1 and 2, the sensing tip 14 is displaced relative to the surface 15 of the workpiece 16 in the plane of the surface 15, the elevation position of the sensing tip 14 is changed pursuant to the fine profile of the surface 15. Correspondingly, the triple mirror 9 changes its position relative to the diffraction grating 7 on the plate 1, so that the path of the light along the arrows 8 and 10 toward the triple mirror 9 and back is also changed. The result is that the interference pattern in the reference waveguide 3 is modified in proportion to the movement of the sensing tip 14 and shows up at the photoelectric diode 17 as a change in the output current.

FIG. 3 illustrates a modification of the embodiment according to FIG. 1. Like parts are provided with like reference numerals. The difference is that the triple mirror 9 is disposed at the upper end of a measuring rod 28 vertically slidably mounted in a guide 27. Secured to the lower end of the measuring rod 28 is a sensing tip (sensor) 29 shown to be in contact with a workpiece 30 placed on a table 31.

Figure 4:
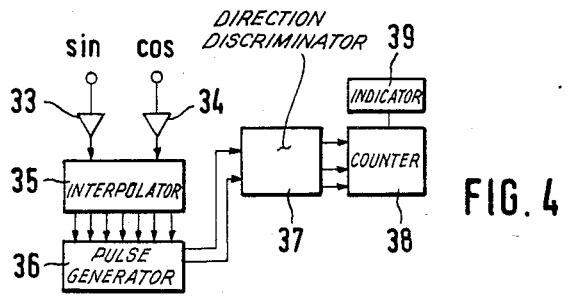
FIG. 4 is a block diagram of the indicating means forming a part of the optoelectronic device according to FIG. 1.

FIG. 4 is a block diagram for evaluation and indication of the output signals of the photoelectric diodes 17 and 22 which are shown as sine and cosine signals to clearly illustrate their phase position with respect to each other. Following voltage/current transformation and amplification in amplifiers 33 and 34, the rotating field interpolation is effected by a rotating field interpolator 35. The rotating field interpolator 35 is capable of subdividing a complete cycle of 360° of the rotating field into n divisions. A complete rotating field cycle corresponds to a displacement of the measuring mirror ½ of the laser wavelength. The signal for the up and down counter 38 is worked up by a serially following square wave pulse generator 36 having a counting direction discriminator 37. Connected to the counter 38 is an indicator 39. Movement of the triple mirror 9 in one direction causes the signal at the photoelectric diode 22 to lead the signal at the photoelectric diode 17 by 90°, and the counter 38 is counting in one particular direction. Reversal of the direction of movement of the triple mirror 9 causes the signal at the photoelectric diode 22 to trail the signal at the photoelectric diode 17 by 90°. The up and down counter 38 also reverse its direction of counting. In each instance, the counter 38 counts n divisions (or parts) of cycles of the rotating field. The resolution thus achievable for the measuring stroke depends therefore solely on the magnitude of the subdivisions of the rotating field and on the stability of the system as a whole.

Figure 5:
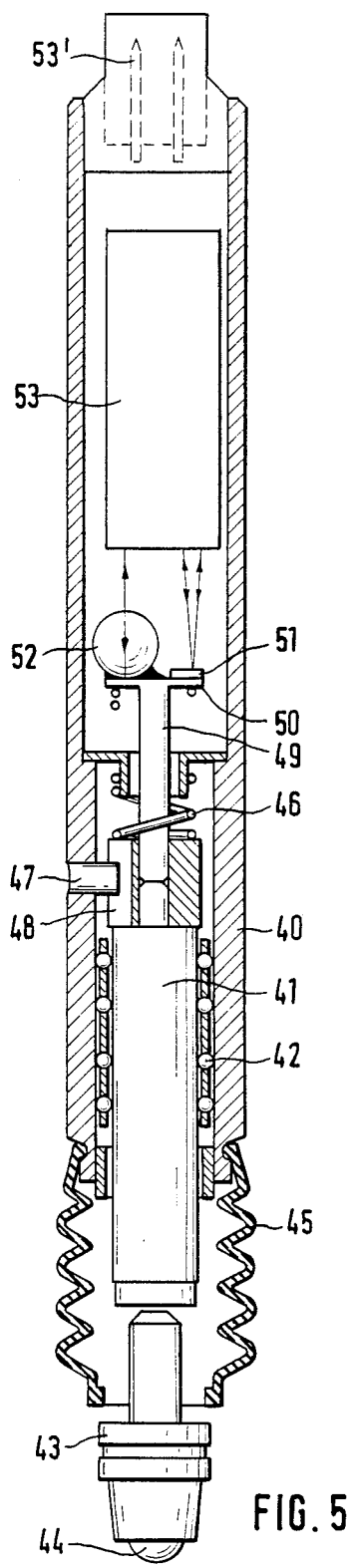
FIG. 5 depicts a cross-section view of an example of an embodiment of the invention in FIG. 1 wherein absolute measurements are possible.

FIG. 5 shows a cross-sectional view of a length measuring sensor for absolute measurement. Inside a casing 40, a striker unit 41 is supported by a roller guide 42. The striker unit may be displaced in the axial direction. The striker 41 projects out of the casing 40, and is provided there with the part 43, which is depicted separately. On the end of the part 43, there is a spherically shaped sensing tip 44. The striker unit 41 is protected against dust by a bellows unit 45.

The striker unit 41 is prestressed in the support direction of the scanning point 44 by a helical spring 46. The movement of the striker unit 41 is limited by a page 47, which extends into a groove 48.

The striker unit 41 has, on its rear end, a bar 49. A plate 50 is located on the end of the bar 49. A plane mirror 51 and a glass sphere 52 are attached to the plate 50.

An optical electronic component 53 is positioned at a distance from the plane mirror 51 and the glass sphere 52. The electronic component 53 is attached by means of plug contacts 53'. The plug contacts 53' are interconnected to a counter of the interferometer (which is not depicted) and a comparator for the focus position measuring system (which is also not depicted).

Figure 6:
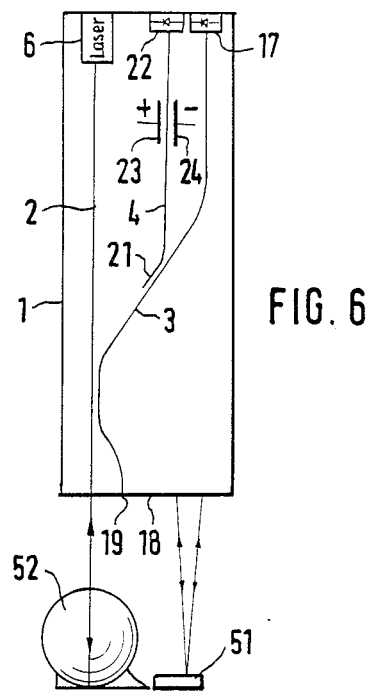
FIG. 6 depicts the optical position of the preferred embodiment shown in FIG. 5 as seen from the right side.
Figure 7:
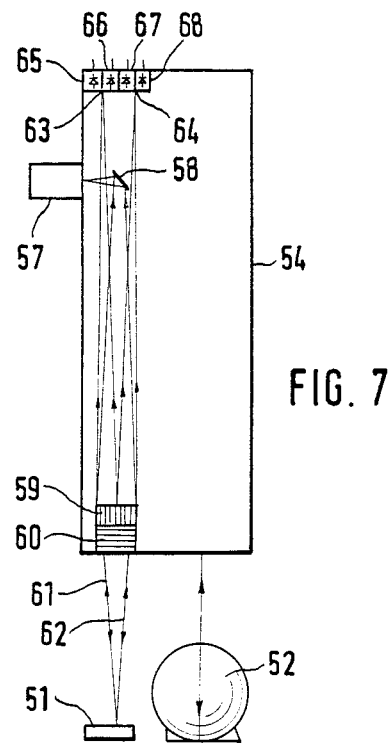
FIG. 7 depicts the optical position of the preferred embodiment shown in FIG. 5 as seen from the left side.
Figure 8:
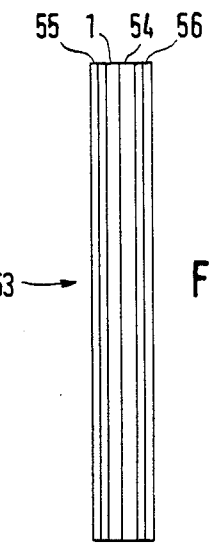
FIG. 8 depicts the construction of layers of the optical portion of the preferred embodiment shown in FIGS. 6 and 7.

FIG. 6 shows, in a simplified manner, the optical electronic unit 53 and clarifies its construction from two plates 1 and 54, with photoconductive layers 55 and 56. The plate 1 is the same is the same as that in the example of an embodiment shown in FIG. 1. Thus, in the photoconductive layer 55, the same optical means are provided as in FIG. 1, so that the same reference numbers are used here. Only the diffraction screen 7 has been eliminated, so that the light from the measuring oscillation conductor 2 exits in the direction of the plate on the side, as is shown in FIGS. 5 to 7. The function of the optical elements on the plate 1 as interferometer is the same as that described in connection with FIG. 1. When changing the distance of the sphere 52 from the plate 1, electrical currents arise on the photodiodes 17 and 22. These currents corresponds to the interference and, thus, the relative change of the distance between sphere 52 and plate 1.

Corresponding to the construction in accordance with FIG. 6, the plate 1 is adhered by means of another 54. The photoconductive layer 56 is uniform over its entire extent, so that a path of beams can form in accordance with FIG. 7. A laser 57 is positioned laterally on the plate 54, and radiates on a mirror 58 inclined by 45°, which directs the light on the focusing screen 59 and 60. Thus, the rays 61 ad 62 issuing out of the laser 57 are focused on the surface of the mirror 51.

From the mirror 51, the light travels back again to the focusing screen 60 and 59, whereby the latter functions as a beam separator, and focuses half of the light on two different focus points 63 and 64. The focus point 63 lies exactly between the diodes 65 and 66, on the one hand, and the focus point 64 lies exactly between the diodes 67 and 68, on the other, if the mirror 51 is precisely within the focus of the beams 61 and 62. Comparators are connected to the diodes 65, 66, 67 and 68. The comparators, in focus position represented here, emit a signal for the interference values at the counter stated previously, in order to set the counter to zero.

If the mirror 51 moves because of a movement of the sensing tip 44, the counter is then always set at zero. As a result, the absolute value is produced if the mirror 51 runs through the precise focus position.

Figure 9:
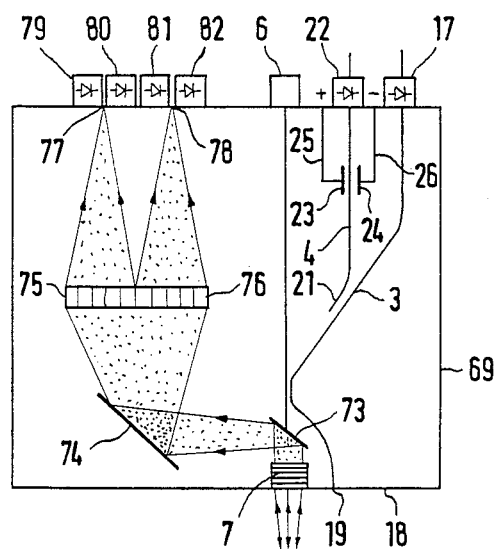
FIG. 9 depicts an alternative embodiment of the invention shown in FIG. 5.
Figure 10:
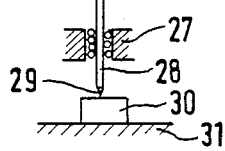
FIG. 10 is a lateral view of the preferred embodiment shown in FIG. 9.

FIG. 9 shows, in a top plan view, and FIG. 10 shows, in a side view, a plate 69 with a photoconductive layer 70. On the layer 70, on the right side in FIG. 9, an interferometer is constructed in the manner depicted in FIG. 1. The same reference numbers are therefore used here for the same parts. The position of the measuring striker 28 is that given in FIG. 3, so that the same reference numbers are used here again. Instead of the triple mirror 9 on the upper end of the measuring striker 28, a glass sphere 71 is provided. The light reflected from this moves into the interferometer in precisely the same manner as has been described in connection with FIG. 1. In addition, a deflecting mirror 72 is provided here, so that the measuring striker 28 can extend approximately in the direction of the plate 69. Thus, an overall flat structure is present, through which a very low overall construction height or width can be attained.

The light reflected from the glass sphere 71 is partly diverted by a partially transparent mirror, and, through a deflection mirror 74, reaches the focus screen 75 and 76. Each of the focus screen 75 and 76 focuses half of the light on one of the focus points 77 and 78. The focus points 77 and 78 are positioned precisely between pairs of photodiodes 79, 80 and 81, 82, if the reflecting point of the glass sphere 71 is precisely in focus. Comparators are connected to the photodiodes 79–82 in precisely the same manner as in the embodiment shown in FIG. 7. If the photodiodes of the equivalent pairs are illuminated, that is, the focus points 77, 78 lie precisely between the photodiodes, the comparators emit a signal. The signal is emitted in order to set the counter connected to the photodiodes 17 and 22 to zero.

Figure 11:
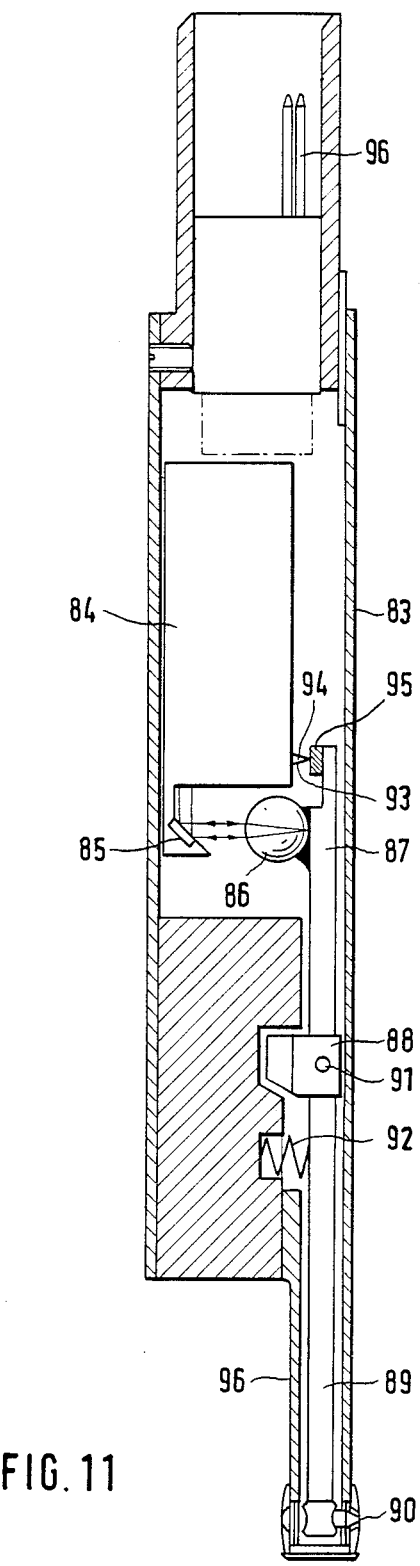
FIG. 11 depicts a cross-sectional view of a third alternative embodiment of the invention of FIG. 5, for absolute measurement.

FIG. 11 shows an example of an embodiment with a cylindrical casing 83. As in the example of an embodiment shown in FIG. 5, an optical electronic unit 84 (similar to the optical electronic unit 53 in FIG. 5) is positioned in the casing 83. The fundamental construction is the same as in FIGS. 6 and 7. One difference is that, in addition, a deflecting mirror 85 is provided for the interferometer. The mirror 85 deflects the light from the measuring oscillation conductor 2 (FIG. 6) by 90°, specifically in the direction of motion of a sphere 86. The sphere 86 is positioned on the rear end of a double lever 88. A sensing tip 90 is located on the external arm 89 of the double lever 88. The double lever 88 rotates around a peg 91, and is prestressed in the scanning direction by means of a helical spring 92.

A further difference regarding the optical electronic unit 84, relative to the optical electronic unit 53 is accordance with FIG. 5, consists of the fact that beams 93 and 94 emerge laterally out of the optical electronic unit 84. The beams are then directed to a mirror 95, which corresponds to the mirror 51 in FIGS. 6 or 7. Inside the optical electronic unit 84, there is located a deflection mirror (which is not depicted) so that the path of the beams is therefore the same as in FIG. 7.

The arm 89 is protected by a tube 96 out of which the sensing tip 9 projects through an opening in the tube 99. On the other end of the casing 83, there are again located plug contacts 96, which correspond to the plug contacts 53' in FIG. 5.

What is claimed is:

1. A device for measuring small distances, said device including a sensing tip mounted to be movable in the direction of the distance to be measured, a transducer for converting the movements of said sensing tip into corresponding electric signals, and indicating means for indicating said electrical signals, characterized in that said transducer comprises:
   a laser for emitting light;
   an optical interferometer, said interferometer including first and second ends and a measuring waveguide, said first end interconnected to said laser;
   optical means, interconnected to said second end of said measuring waveguide, for focusing said light; and
   a measuring mirror, disposed at a distance from said optical means, for receiving said focused light and reflecting said light back to said optical means, said mirror being interconnected to said sensing tip;
   said interferometer further including a reference waveguide coupled to said measuring waveguide, at one end having disposed a mirror and at its other end having disposed a photoelectric transducer connected to said indicating means for indicating the electric output signal of the photoelectric transducer, wherein said indicating means consists of a counter; said device further comprising
   an optical electronic range finder, said range finder producing an electrical signal dependent on the distance of scanning points from the interferometer; and
   reset means, interconnected to said range finder, for responding to a present value of the electrical signal and setting the counter at zero.

2. A device as claimed in claim 1, wherein said optical electronic range finder is a focus position measuring system with a laser emitting a light, said device further comprising
   a first focusing device for directing said light;
   a reflecting surface for receiving light from the first focusing device and reflecting the light;
   a second focusing device for receiving reflected light from the reflecting surface and focusing the light;
   two photodiodes, which are substantially adjacent, for receiving focused light from the second focusing device, whereby, when the reflecting surface is in focus, the focus of the light focused on the photodiodes falls substantially symmetrically about the photodiodes; and
   a comparator, connected with the photodiodes, for producing an output signal, which sets the counter connected with the comparator back to zero upon sensing substantial equality of the electrical signals emitted by both the photodiodes.

3. A device as claimed in claim 2 wherein said reflecting surface includes a mirror positioned to move with said device.

4. A device as claimed in claim 2 further comprising a plate with a photoconductive layer and wherein the first and second focusing devices are constructed as a focusing screen, and wherein said laser and the photodiodes are coupled to said focusing screen.

5. A device as claimed in claim 4 wherein both the plates for the interferometer and the focus position measuring system are laminarly adhesed to one another.

6. A device as claimed in claim 4, further comprising a deflecting mirror positioned with an inclination of approximately 45° to the plate.

7. A device as claimed in claim 4 wherein said deflecting mirror is positioned above the first focusing screen.

8. A device as claimed in claim 4 wherein both the plates for the interferometer and the focus position measuring system consist at least in part of a common piece.

9. A device as claimed in claim 2 wherein
   the laser for the focus position measuring system is formed by the laser for the interferometer;
   the mirror is the measuring reflector; and
   a partially transparent mirror is obliquely positioned inside a measuring oscillation lead, said partially transparent mirror diverting a part of the light reflected by the measuring reflector, and directing said part of the light to the second focusing device.

10. A device for measuring small distances, said device including a sensing tip mounted to be movable in the direction of the distance to be measured, a transducer for converting the movements of said sensing tip into corresponding electric signals, and indicating means for indicating said electrical signals, characterized in that said transducer comprises:
    a laser for emitting light;
    an optical interferometer, said interferometer including first and second ends and a measuring waveguide, said first end interconnected to said laser;
    optical means, interconnected to said second end of said measuring waveguide, for focusing said light; and
    a measuring mirror, disposed at a distance from said optical means, for receiving said focused light and reflecting said light back to said opticl means, said mirror being interconnected to said sensing tip,
    said interferometer further including a reference waveguide coupled to said measuring waveguide, at one end having disposed a mirror and at its other end having disposed a photoelectric transducer connected to said indicating means for indicating the electric output signal of the photoelectric transducer, said reference waveguide being linked to a branch waveguide;
    a first plate, said measuring waveguide, reference waveguide, and the branch waveguide being formed about the surface of said first plate, wherein the laser and the photoelectric transducers are directly disposed at an edge of the first plate, at which edge the respective ends of the said waveguides terminate, wherein the mirror disposed at one end of the reference waveguide is comprised of a reflecting coating applied to the lateral edge of the first plate up to which said reference waveguide extends;

an optical electronic range finder, said optical electronic range finder being a focus position measuring system; and a second plate with a photoconductive layer, wherein both the first and second plates for the interferometer and the focus position measuring system are laminarly adhesed to one another.

* * * * *